United States Patent [19]
Ostholt, Rüdiger et al.

[11] Patent Number: 5,285,886
[45] Date of Patent: Feb. 15, 1994

[54] CONVEYOR SYSTEM

[75] Inventors: Ostholt, Rüdiger, Wetter; Frank Ahrens, Hohen-Neuendorf, both of Fed. Rep. of Germany

[73] Assignee: Mannesmann Aktiengesellschaft, Dusseldorf, Fed. Rep. of Germany

[21] Appl. No.: 989,596

[22] Filed: Dec. 14, 1992

[30] Foreign Application Priority Data

Dec. 12, 1991 [DE] Fed. Rep. of Germany ....... 4140917

[51] Int. Cl.$^5$ .............................................. B65G 47/46
[52] U.S. Cl. ...................... 198/370; 198/372; 198/440
[58] Field of Search ............... 198/365, 370, 372, 456, 198/457, 440

[56] References Cited

U.S. PATENT DOCUMENTS

| | | |
|---|---|---|
| 4,711,341 | 12/1987 | Yu et al. |
| 4,732,259 | 3/1988 | Yu et al. ........................ 198/372 X |
| 4,738,347 | 4/1988 | Brouwer et al. ...................... 198/372 |
| 4,760,908 | 8/1988 | Houghton . |
| 4,971,190 | 11/1990 | Berends et al. .................. 198/372 X |
| 5,027,939 | 7/1991 | Kilper et al. ..................... 198/372 X |
| 5,038,912 | 8/1991 | Cotter . |
| 5,127,510 | 7/1992 | Cotter et al. ......................... 198/372 |

Primary Examiner—D. Glenn Dayoan
Attorney, Agent, or Firm—Cohen, Pontani, Lieberman, Pavane

[57] ABSTRACT

A conveyor system for conveying articles includes a conveyor track and at least one branch track. The conveyor track includes endless circulating chains, which are spaced apart and extend parallel to each other, and support rods extending between the chains. Deflection slide members are guided on the support rods for deflecting the articles from the conveyor track onto the branch track. Each deflection slide member has a downwardly extending guide bolt. A guide rail is provided underneath the conveyor track, and a branch rail is arranged underneath the branch track. The guide rail and the branch rail meet in a branching-off point. A control body is movable into the branching-off point for deflecting the guide bolt. An elongated guide member is swingably mounted on the guide bolt.

15 Claims, 4 Drawing Sheets

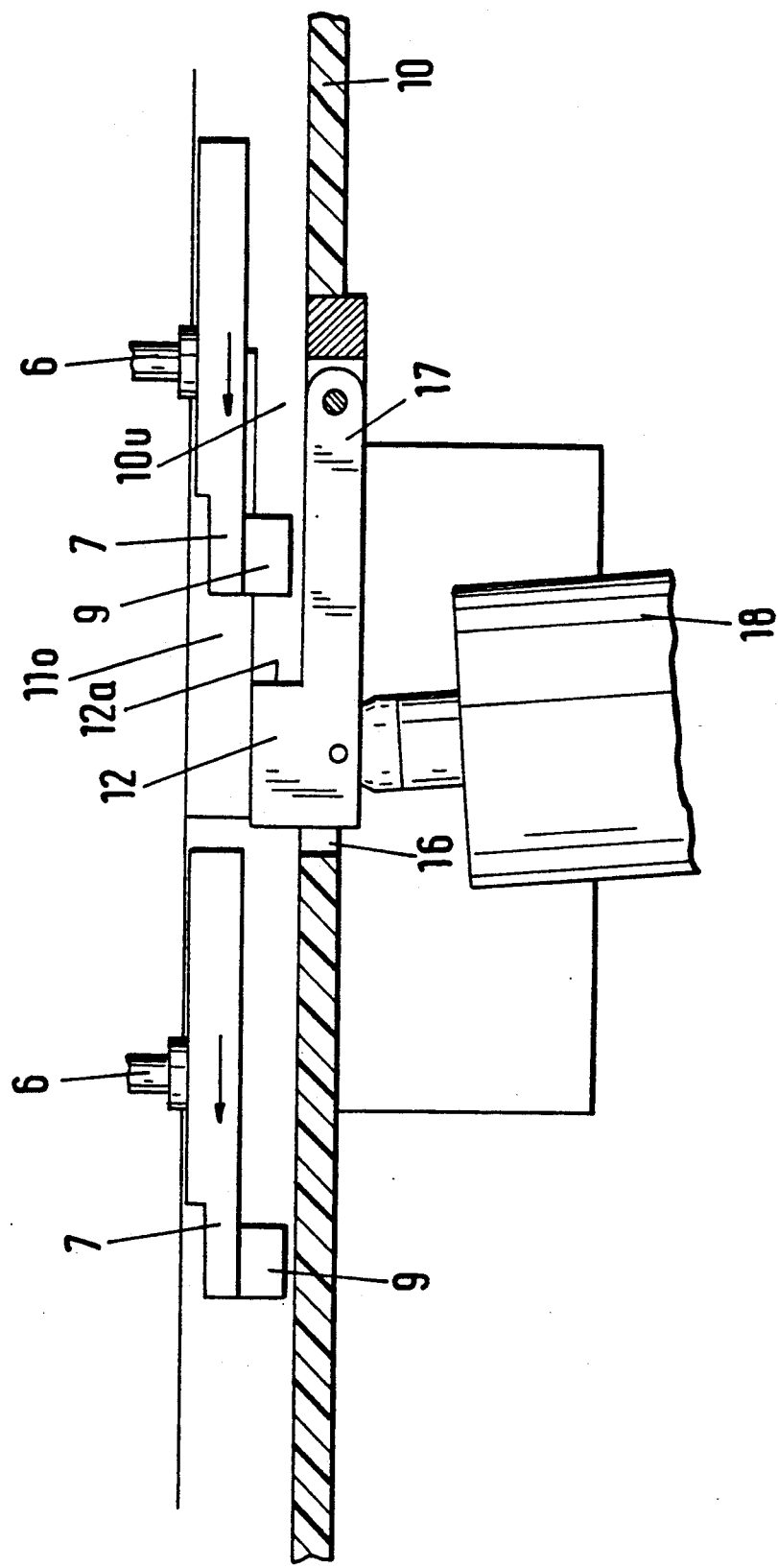

CONVEYOR SYSTEM

BACKGROUND OF THE INVENTION

1. Field of the Invention

The present invention relates to a conveyor system for distributing articles to be transported from a conveyor track to at least one branch track. The conveyor system includes a conveyor track composed of endless circulating chains, which are arranged spaced apart and parallel to each other, and support rods for the articles fastened between the chains. Deflection slide members are guided on and between the support rods, wherein the deflection slide members project beyond the conveying plane formed by the support rods for deflecting the articles onto the branch track. Each deflection slide member has a guide bolt extending in the opposite direction. The conveyor system further includes rails for guiding the guide bolts, wherein the rails are arranged parallel to the conveying direction for guiding the deflection slide members in a position of rest. For guiding the deflection slide members during the deflection procedure, the rails extending parallel to the conveying direction are connected in branching areas by branch rails extending obliquely to the conveying direction and intersecting each other at intersections. Guide members for deflecting the guide bolts are arranged, at least in the branching points, from the rails to the branch rails.

2. Description of the Related Art

U.S. Pat. No. 4,711,341 discloses a conveyor system of the above-described type for sorting packages. This conveyor system essentially consists of a main conveyor and branch tracks which are arranged laterally next to the main conveyor. If desired, the packages being transported on the main conveyor are moved laterally by deflection slide members onto the branch tracks. The deflection slide members are guided between support rods of the main conveyor arranged horizontally and transversely to the main conveying direction. The ends of the support rods are connected to two endless chains which are arranged parallel to each other and spaced from each other. The deflection slide members are provided with guide pins which project downwardly between the support rods. The guide pins are guided by rails arranged underneath the support rods. The rails are arranged parallel to the main conveying direction and at an angle relative to the main conveying direction. At least two parallel rails are connected to each other by rails which extend at an angle to and branch off from the parallel rails. Control units are arranged in the areas of the branches and intersections of the rails extending at an angle. The control units ensure that the guide pins are deflected in the areas of the connections and that the guide pins are guided along a straight line in the areas of the intersections. The control units are comparable to switches which include a control body which can be moved into and out of the guide path of the guide pin. The deflection slide members are in a position of rest when the guide pins are guided by the parallel rails. The deflection slide members are in operation and laterally push the packages when the guide pins of several successive deflection slide members are guided by means of a switch onto the rail extending at an angle.

Since the elongated control body of the control elements constructed as switches or cross-over switches has a long shifting path, it may happen that the guide pin of a deflection slide member makes contact with the guide body during an intermediate position of the switch, and that this causes interruptions in the operation of the conveyor system. Moreover, the long switching path of the control body leads to long switching periods which, in turn, limit the maximum conveying speed of the main conveyor. In addition, the conveyor system produces substantial noise as a result of the switching of the control elements.

U.S. Pat. No. 5,038,912 discloses another conveyor system for sorting packages which includes a switch with a control body which can be raised into the guide path of the guide pin in order to shorten the time required for switching the switch.

U.S. Pat. No. 4,760,908 describes another sorter conveyor which includes deflection slide members with guide pins, wherein guide bodies which are symmetrical with respect to rotation are rotatably mounted on the guide pins.

SUMMARY OF THE INVENTION

Therefore, it is the object of the present invention to provide a conveyor system of the above-described type for distributing articles to be transported, wherein the deflection slide members are guided securely and so as to produce little noise, while the intersections are simultaneously structurally simplified and the switching periods of the switching elements are improved.

In accordance with the present invention, in a conveyor system of the above-described type, an elongated guide member is swingably attached to the guide bolt.

Accordingly, in a conveyor system for distributing articles by means of deflection slide members for pushing the articles onto a branch track, the arrangement of a swingably mounted elongated guide body on the guide bolt of the deflection slide member in accordance with the present invention provides the advantage that the intersections of the branch rails can be constructed without control elements for guiding the deflection slide members during the deflection procedure. As a result, the area of the intersection does not require maintenance and, because no control members are present, the deflection slide members can travel through the intersection without delay.

In accordance with an advantageous feature of the present invention, the guide member is a parallelepiped with a rectangular cross section in horizontal direction, wherein the ratio of the length to the width of the rectangle is approximately 4:1. The rail is U-shaped, and the distance between the sides of the U-shaped rail is approximately 5% greater than the width of the guide member. As a result, the guide member is securely guided when traveling through the stretch of the intersection where no lateral guidance is provided.

In accordance with another feature, the guide member is mounted on the guide bolt at half its length in longitudinal direction. As a result, swinging of the guide body during deflection onto the branch rail is facilitated.

In accordance with a particularly advantageous development of the present invention, the guide member is provided with a guide element arranged at the front end of the guide member seen in travel direction, wherein the guide element projects downwardly from the contour of the guide member. Corresponding to the arrangement of the guide element, the branching-off points have inner curve or branching guide surfaces which are divided into two portions which are vertically spaced from each other, wherein one portion serves to guide the guide member, and the other portion serves to guide the guide element. This configuration results in a secure guidance and deflection of the guide member with its guide element. In addition, this configuration of the guide member with its guide element, and of the guide surfaces at the branching-off points, makes it possible, even with the elongated guide member according to the present invention, to minimize the stretch along which the guide member is guided only on one side.

In accordance with another advantageous feature, the control body can be moved into the travel path of the guide member and/or guide element for deflecting the guide member by means of an actuator, because only a short actuation distance is required which, therefore, can be carried out quickly. This makes it possible to minimize the switching periods at the branching-off point and to increase the speed of the main conveyor.

The control body according to the present invention has a width which corresponds to the spacing between the sides of the U-shaped rail. The control body has the shape of a trihedral prism with a rectangular base area, wherein the surface on the side of the hypotenuse serves as the surface for guiding the guide member.

Another advantageous feature provides that the guide element connected to the guide member is constructed as a roller. As a result, the deflection of the deflection slide members causes little wear.

By combining the intersection without switching elements with a branching-off point which includes a raisable control body, the present invention realizes a conveyor system which facilitates a high conveying speed of the main conveyor and a high switching reliability.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there is illustrated and described a preferred embodiment of the invention.

BRIEF DESCRIPTION OF THE DRAWING

In the drawing:

FIG. 7 is a side view of the portion of the conveyor system shown in FIG. 6.

DESCRIPTION OF THE PREFERRED EMBODIMENT

Figure 1:
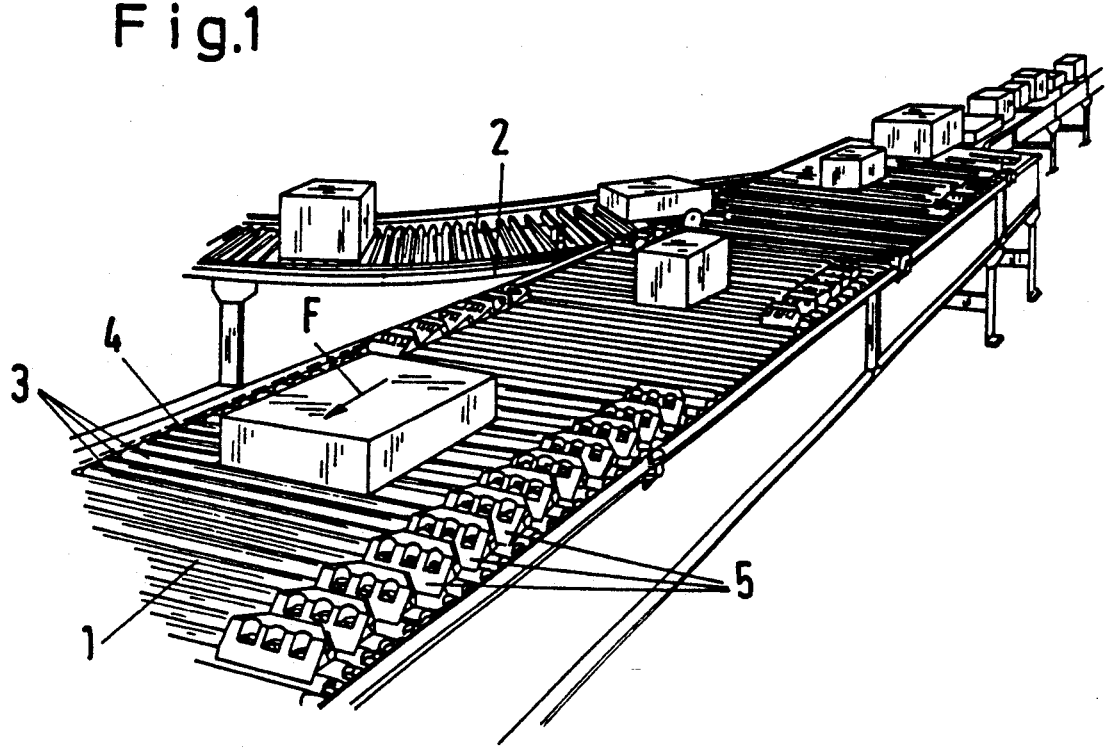
FIG. 1 is a perspective view of a conveyor system known in the prior art.

FIG. 1 of the drawing shows a portion of a conveyor system known in the art. The conveyor system includes a conveyor track 1 for articles to be transported, particularly packages. When required, the articles can be deflected onto a branch track 2 by means of deflection slide members 5 which are arranged on the conveyor track 1 and are horizontally and laterally movable. As shown in FIG. 1, the branch track 2 connects to the right-hand side of the conveyor track 1 as seen in conveying direction F. The conveyor track 1 is composed of horizontal support rods 3 which support the articles to be transported. The support rods 3 are arranged between endless circulating chains 4 which are guided inside walls, not shown, of the conveyor track 1 and are guided around guide wheels, not shown, at the beginning and end of the conveyor track 1.

Figure 2:
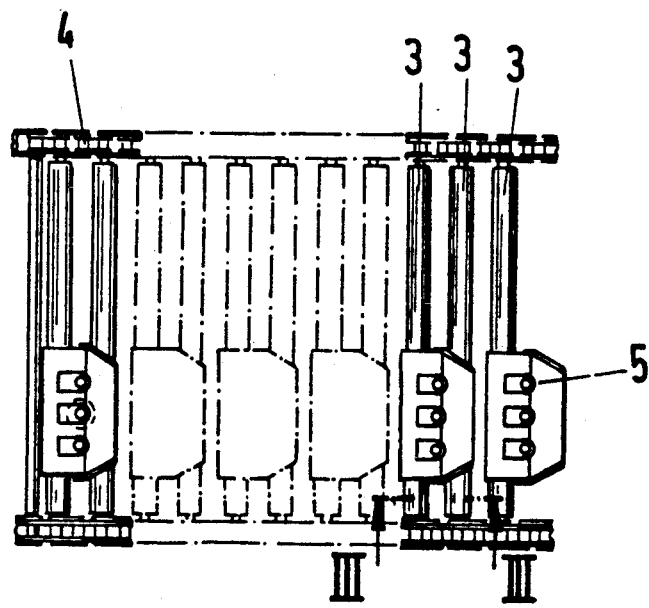
FIG. 2 is a top view of a portion of the conveyor system of FIG. 1.

FIG. 2 is a top view of a portion of the conveyor track 1 of FIG. 1. As FIG. 2 shows, the support rods 3 extend parallel to each other and are spaced from each other, and the support rods 3 are attached to chains 4. A pair of support rods 3 always support and horizontally guide a deflection slide member 5 which is displaceable transversely of the conveying direction F of the conveyor track 1.

Figure 3:
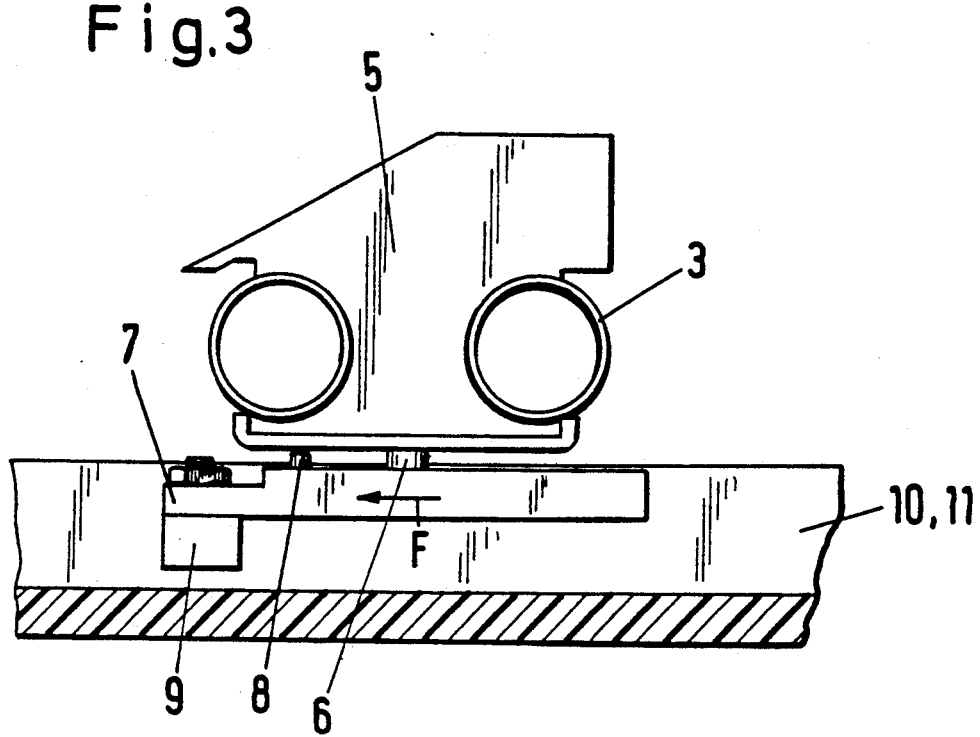
FIG. 3 is a sectional view taken along sectional line III—III showing a deflection slide member with a guide member according to the present invention.

FIG. 3 is a sectional view of a detail of the conveyor track of FIG. 2. FIG. 3 shows, on a larger scale, a deflection slide member 5 which surrounds each support rod 3 by an angle of approximately 180°. A portion of the deflection slide member 5 projects upwardly above the support rods 3, so that the deflection slide member 5 can laterally push the article being conveyed on the support rods 3. At the lower end of the deflection slide member 5, a guide bolt 6 is arranged which also projects vertically out of the region of the support rods 3.

An elongated guide member 7 is arranged on the guide bolt 6. The guide member 7 is swingable about the guide bolt 6. In a position of rest of the deflection slide member 5, the guide member 7 is aligned with its longitudinal direction in the conveying direction F, and the guide member 7 can be swung toward the left or the right from the conveying direction F by an angle of approximately 30°. The swinging movement of the guide member 7 is limited by a stop pin 8 which is arranged on the side of the guide member 7 which faces the deflection slide member 5. In the maximum swinging position, the stop pin 8 makes contact with a stop member, not shown, arranged at the bottom side of the deflection slide member 5. The guide member 7 is a parallelepiped and has, in the middle of its longitudinal extension, a bore for receiving the guide bolt 6. The ratio of length to width of the guide member is approximately 4:1.

A guide element 9, which projects downwardly from the contour of the guide member 7, is mounted on the guide member 7 at the front end thereof, as seen in conveying direction F and on the side facing away from the deflection guide member 5. The guide member 7, including the guide element 9, is guided by main rails 10 and guide rails 11 which are arranged underneath the support rods 3 which convey the articles to be transported. The rails 10, 11 are U-shaped and have upwardly extending sides. The guide element 9 is a roller which is mounted so as to be rotatable about an axis extending parallel to the sides of the rails 10, 11. The guidance of the guide member 7 with the guide element 9 is effected by the sides of the rails 10, 11, wherein the distance between sides is approximately 5% greater than the width of the guide member 7 with the guide element 9.

Figure 4:
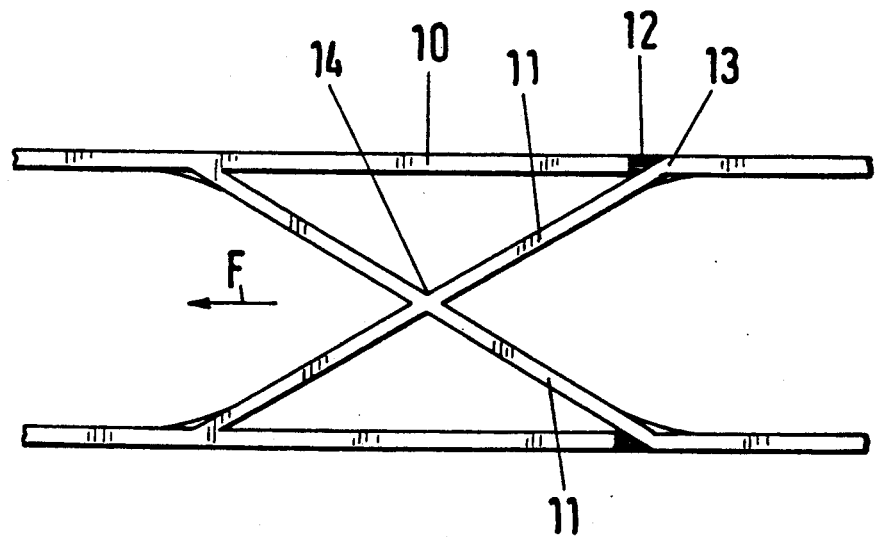
FIG. 4 is a schematic top view of the rails for guiding the deflection slide members underneath the support rods.

FIG. 4 is a top view of the U-shaped rails 10, 11 which are arranged underneath the support rods 3 supporting the articles to be conveyed and which are in engagement with the guide members 7 and the guide elements 9. The rails 10 extend parallel to the conveying direction F of the conveyor track 1, and the guide rails or branch rails 11 extend at an angle relative to the conveying direction F. The two rails 10, which extend parallel to each other and are spaced from each other, are arranged in the region underneath the ends of the support rods 3 and are connected to each other by branch rails 11 which extend between branching-off points 13. The purpose of the parallel rails 10 is to guide the deflection slide members 5 in a nonoperative position, or position of rest, at the edge of the conveyor track 1, as illustrated in FIG. 1 of the drawing.

Control bodies 12 for deflecting the guide member 7 with the guide element 9 from the parallel rails 10 onto the branch rails 11, arranged at an angle, are provided at the branching-off points 13. The control body 12 can be raised into the travel path of the guide element 9 and is provided only on the branching-off points 13, at which in conveying direction F is carried out a deflection of the deflection guide member 5 from the rail 10 to the branch rail 11. After the control body 12 has been raised, several deflection slide members 5, which have been guided onto the branch rail 11, carry out the pushing movement of the article to be conveyed onto a branch track 2 arranged in this area.

In order to make it possible to push the articles being conveyed in both lateral directions and/or to return the deflection slide member 5 to the rail 10 on which it originally traveled, branch rails 11 are arranged connected to the right or left rail 10, as seen in conveying direction F. As a result, the branch rails 11 which extend at an angle can form intersections 14.

Figure 5:
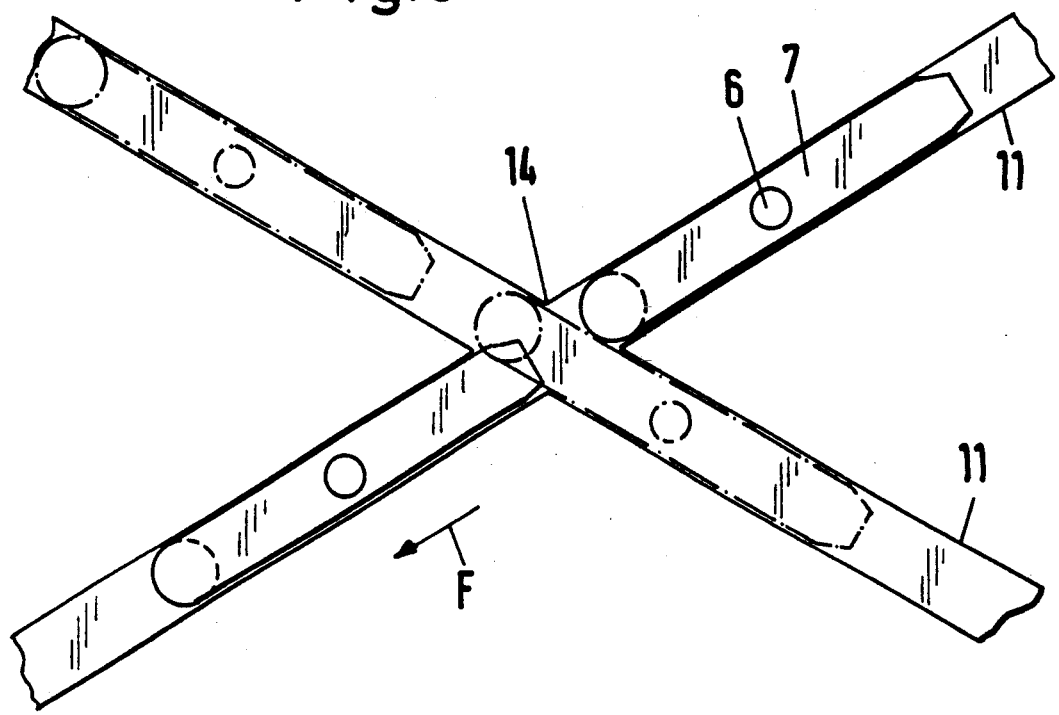
FIG. 5 is a top view, on a larger scale, of the area of intersection of the conveyor system.

FIG. 5 shows, on a larger scale, a detail of FIG. 1 with the intersection 14. As is clear from FIG. 5, the guide member 7 is safely guided through the intersection 14 from the guide rails 10 and the branch rails 11 because the length of the guide member 7 corresponds to approximately four times the width of the U-shaped branch rail 11.

Figure 6:
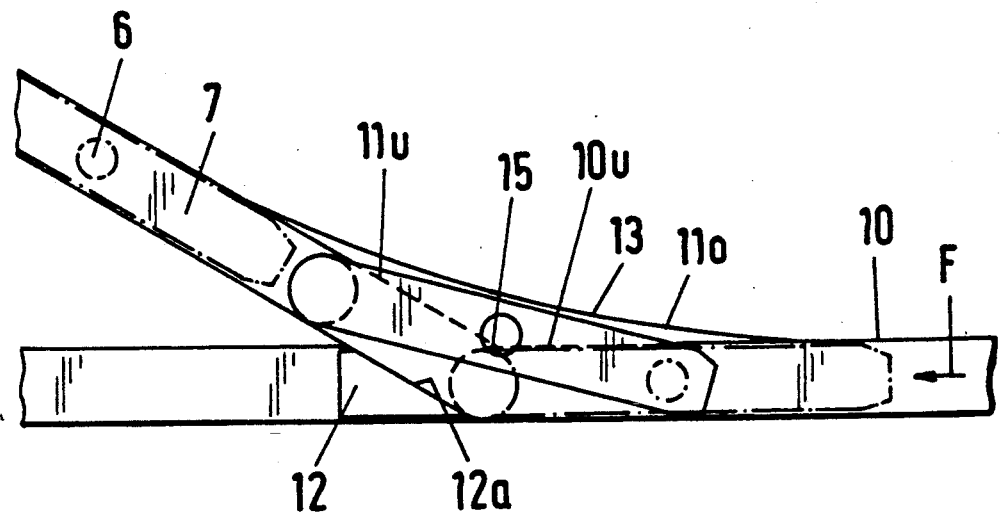
FIG. 6 is a top view, also on a larger scale, of a branching-off point.

FIGS. 6 and 7 of the drawing show the branching-off point 13 in more detail and explain the manner in which the guide member 7, with the guide element 9, is deflected from the rail 10 onto the branch rail 11. In the area of the branching-off point 13, the side surfaces of the guide member 7, on the one hand, and the side surfaces of the roller-shaped guide element 9, on the other hand, are guided separately. For this purpose, the side wall of the rails 10, 11 is divided in the area of the branching-off point 13 in an upper portion 11o for guiding the guide member 7 and a lower portion 10u, 11u for guiding the guide element 9. When a guide member 7, with a guide element 9, travels into the branching-off point 13, starting at a distance of approximately three-quarters of the length of the guide member 7 from a corner point 15 formed by the inner walls of the rail 10 and the branch rail 11, the guide member 7 is guided with its guide element 9 only on the lower side wall 10u. This type of guidance continues until the corner point 15 is reached. On the outer side wall of the rail 10, the guide member 7 and the guide element 9 are being guided.

For starting the pushing movement of the deflection slide members 5, a control body 12 is raised into the travel path of the guide element 9. When the guide element 9 makes contact with the control body 12, the guide member 7 swings about the guide bolt 6 and is guided by the control body 12 onto the branch rail 11 which extends at an angle relative to the rail 10. In order to make it easier to start the swinging movement, the elongated guide member 7 has, in the rear part thereof, beveled side surfaces which make the guide member 7 narrower at the rear, and the front portion of the guide member 7 is rounded.

The swinging movement of the elongated guide member 7 is further facilitated because the upper portion 11o of the inner side wall of the rails 10, 11 is curved approximately three-quarters of the length of the guide member 7 in travel direction before and behind the corner point 15 for guiding the guide member 7. Thus, the guide member 7 is guided in the branching-off point 13, and jamming of the guide member 7 is not possible. The upper portion 11o of the curved side wall is connected directly and continuously to the side walls of the rails 10, 11 and is convex, as seen from the guide member 7. In addition, along the distance from the corner point 15, which corresponds to approximately three-quarters of the length of the guide member 7, the guide element 9 is guided by the lower portion 11u of the inner side wall of the branch rail 11. After leaving the branching-off point 13, the entire guide member 7, including guide element 9, is being guided by the branch rail 11.

FIGS. 6 and 7 additionally show the arrangement and manner of operation of the raisable control body 12 for deflecting the guide member 7 with the guide element 9. Through a recess 16 formed in the web of the rail 10, the control body 12 can be raised into the travel path of the guide element 9 and, in this raised position, a guide surface 12a of the control body 12 is in linear alignment with the branch rail 11. The control body 12 has the shape of a triangular prism and is fastened with its rectangular base surface on a lever arm 17 arranged in the recess 16. The lever arm 17 can be swung about a horizontal axis which extends transversely to the rail 10. An actuating drive 18 is arranged underneath the control body 12 for carrying out the lifting and lowering movements of the control body 12. Thus, since the control body 12 is fastened to the lever arm 17, the lifting and lowering movement is a swinging movement. As seen from the top, the control body 12 is wedge-shaped. The control body 12 is shaped and arranged in such a way that, in the raised state, only the guide element 9 is guided by the guide surface 12a, and not the guide member 7. The actuating drive 18 may particularly be an electromagnet in which an axially displaceable armature carries out an axial movement by means of magnetic forces which are produced in a coil.

It should be understood that the preferred embodiment and examples described are for illustrative purposes only and are not to be construed as limiting the scope of the present invention which is properly delineated only in the appended claims.

We claim:

1. A conveyor system for conveying articles, the conveyor system comprising a conveyor track and at least one branch track connected with, and extending at an angle relative to the conveyor track, the conveyor track comprising endless circulating chains arranged spaced apart and parallel relative to each other and support rods for supporting the articles being fastened between the chains, a plurality of deflection slide members mounted so as to be slidable on the support rods, the deflection slide members projecting beyond a conveyor plane formed by the support rods for deflecting the articles from the conveyor track onto the branch track, guide rails mounted spaced from the conveyor track, and branch rails arranged spaced from the branch track and connected to the guide rail in a branching-off point, each deflection slide member having a guide bolt on a side facing the rails with an elongated guide member being swingably mounted on the guide bolt, the guide member being guided within the guide rail, a control body mounted at the branching-off point for deflecting the deflection slide member from the guide rail into the branch rail.

2. The conveyor system according to claim 1, wherein the branch rail is mounted so as to intersect another branch rail.

3. The conveyor system according to claim 1, wherein the guide member is a parallelepiped having a length and a width, and wherein the ratio of the length to the width is approximately 4:1.

4. The conveyor system according to claim 3, wherein the guide member is mounted at half its length on the guide bolt.

5. The conveyor system according to claim 3, wherein the guide rail and the branch rail are U-shaped, having sides and a web connecting the sides, wherein a distance between the sides is approximately 5% greater than the width of the guide member.

6. The conveyor system according to claim 5, wherein the guide member comprises a guide element, the guide element projecting beyond the guide member and being mounted on a side of the guide member facing the web of the rail.

7. The conveyor system according to claim 6, wherein the guide member has a front end in conveying direction, the guide element being mounted at the front end of the guide member.

8. The conveyor system according to claim 6, wherein the guide element is a roller, the roller being rotatably mounted on an axis extending parallel to the guide bolt.

9. The conveyor system according to claim 6, wherein the guide member and the guide element have the same width.

10. The conveyor system according to claim 3, wherein the guide member has a front end and a rear end in conveying direction, the guide member having side surfaces, wherein the side surfaces at the front end are rounded, and the side surfaces at the rear end are beveled, over a length portion of the guide member, wherein the length of the length portion corresponds approximately to the width of the guide member.

11. The conveyor system according to claim 6, wherein inner sides of the guide rail and the branch rail define, at the branching-off point, an inner guide surface, the inner guide surface having a lower portion adjacent the web of the rail for guiding the guide element and an upper portion extending upwardly from the lower portion for guiding the guide member.

12. The conveyor system according to claim 11, wherein the lower portion of the inner guide surface being defined by wall members which extend in alignment with the inner sides of the guide rail and of the branch rail and meet at a corner point, and wherein the upper portion of the inner guide surface is curved convexly in a direction away from the guide member, wherein the upper portion of the inner guide surface extends over a length which corresponds to approximately three-quarters of the length of the guide member in front of and behind the corner point in conveying direction.

13. The conveyor system according to claim 6, comprising a drive means for moving the control body into a travel path of one of the guide member and the guide element for deflecting the guide member.

14. The conveyor system according to claim 13, wherein the web of the guide rail defines a recess, the control body being raisable into the travel path of the guide element through the recess, and wherein, when the guide body is in the travel path of the guide element, the guide body is in alignment with an outer side of the branch rail for deflecting the guide element.

15. The conveyor system according to claim 14, wherein the control body has the shape of a triangular prism having a rectangular base surface, wherein a hypotenuse side of the prism defines a guide surface facing the guide member.

* * * * *